United States Patent [19]

Horgan

[11] Patent Number: 4,478,039
[45] Date of Patent: Oct. 23, 1984

[54] UTILIZATION OF COAL IN A COMBINED CYCLE POWERPLANT

[75] Inventor: John J. Horgan, Wethersfield, Conn.

[73] Assignee: United Technologies Corporation, Hartford, Conn.

[21] Appl. No.: 501,591

[22] Filed: Jun. 6, 1983

Related U.S. Application Data

[63] Continuation of Ser. No. 220,543, Dec. 29, 1980, abandoned.

[51] Int. Cl.³ .............................................. F02C 3/28
[52] U.S. Cl. ................................. 60/39.02; 60/39.12; 60/39.182
[58] Field of Search ............... 60/39.02, 39.12, 39.182, 60/39.464, 39.511

[56] References Cited

U.S. PATENT DOCUMENTS

| | | | |
|---|---|---|---|
| 3,446,014 | 5/1969 | Foster-Pegg | 60/39.02 |
| 3,847,563 | 11/1974 | Archer et al. | 48/72 |
| 3,978,657 | 9/1976 | Fulton et al. | 60/39.12 |
| 4,387,560 | 6/1983 | Hamilton et al. | 60/39.02 |

Primary Examiner—Louis J. Casaregola
Attorney, Agent, or Firm—Gene D. Fleischhauer

[57] ABSTRACT

A method for producing power from coal in a combined cycle apparatus 10 is disclosed. A partial gasifier 22 is used to convert the coal into combustible fluids and combustible char. An auxiliary combustor 20 is employed to burn the char and provide heat to the steam turbine engine cycle. The combustible fluids are burned directly in the gas turbine engine cycle. The efficiency of the cycle is improved by adding coal to the gasifier to improve the efficiency of the gasifier and the steam turbine engine cycle.

3 Claims, 9 Drawing Figures

UTILIZATION OF COAL IN A COMBINED CYCLE POWERPLANT

CROSS REFERENCE TO RELATED APPLICATION

This is a continuation of application Ser. No. 220,543 filed on Dec. 29, 1980, now abandoned.

DESCRIPTION

Technical Field

This invention relates to the combustion of coal and particularly to the use of coal-derived fuels with a combined cycle powerplant.

Background Art

Coal is an attractive source of energy because coal reserves are substantially larger than those of oil and natural gas. Traditionally, energy is obtained from the coal by burning the coal directly in a furnace to form high temperature gases. Energy in the form of heat is transferred from the high temperature gases and may be transformed into work by raising and passing steam through a steam turbine. The steam engine may be used alone or in conjunction with a gas turbine engine cycle to form a combined cycle.

In gas turbine engines, hot working medium gases are expanded through a turbine to produce work. One approach to using coal as a source of energy in a gas turbine engine is to first pulverize the coal and to subsequently burn the coal in a combustion chamber of the engine to form the hot working medium gases. Burning coal directly in the engine produces ash and these ash particulates cause damage to the engine as they pass through the engine degrading the service life and the performance of the engine. A second approach to using coal is to first process the coal to obtain combustible gases or liquids. These fluids are produced by heating the coal in the absence of air to drive off the volatile matter (pyrolysis), or, if further gasification is required, combining the non-volatile matter in the coal with oxygen to form a combustible gaseous product. The combustible fluids, either gases or liquids, are cleaned of ash and pollutants and are then burned in the gas turbine engine to produce the hot working medium gases.

Some gasification processes for producing combustible gases also form a carbon rich by-product called char. The char is normally recycled until all of the carbon is gasified. Burning the char directly in the gas turbine engine would improve the gasifier output and cycle efficiency, but, as is the case with pulverized coal, burning the char produces abrasive particulates which may damage the turbine. Accordingly, scientists and engineers are seeking ways to utilize the full heating value of coal in a combined cycle without exposing the gas turbine engine components to abrasive particulates.

Disclosure of Invention

According to the present invention, adding coal to supplementarily fire the boiler of a steam cycle with non-volatile matter derived from the additional coal in a gasifier increases the overall efficiency of a gasified steam and gas turbine combined cycle by providing the gasifier with additional volatile matter to reduce the gasification of non-volatile matter for the gas turbine engine cycle and by increasing the efficiency of the steam turbine cycle.

In accordance with one detailed embodiment of the invention, less of the coal is gasified than is needed to establish the turbine inlet temperature and the additional char, produced in proportion to the decrease in gasification, is burned in the auxiliary combustor; heat from the burning char is transferred to the working medium gases of the gas turbine engine as the gases pass through a heat exchanger in the auxiliary combustor before entering the combustion chamber to increase the efficiency of the gasifier and to maintain the established turbine inlet temperature.

In accordance with a detailed embodiment of the invention, an amount of heat $Q_g$ is transferred from the auxiliary combustor to the partial gasifier for producing gases and char from the coal, the amount of heat $Q_g$ being less than the amount of heat brought into the auxiliary combustor by the exhaust gases from the gas turbine engine.

A primary feature of the present invention is supplementarily firing a steam engine cycle with non-volatile matter from supplementary coal. The volatile matter from the supplementary coal is utilized for firing a gas turbine engine. In one detailed embodiment, non-volatile matter from the coal is burned in the auxiliary combustor and the heat from the burning matter is transferred into the gas turbine engine decreasing the amount of gasification of non-volatile matter required in proportion to the amount of non-volatile matter burned.

The primary advantage of the present invention is the efficiency of the combined cycle which results from supplementary firing. The steam turbine cycle efficiency is increased through the direct combustion of non-volatile matter. Gasifier efficiency is increased by decreasing the amount of non-volatile matter which must be gasified in the gasifier to support optimum operation of the gas turbine cycle. In one detailed embodiment further increased gasifier efficiency results from further decreasing the amount of gasification of non-volatile coal by burning non-volatile matter in the auxiliary combustor and transferring heat to the working medium fluid of the gas turbine engine.

The foregoing, and other objects, features and advantages of the present invention will become more apparent in the light of the following detailed description of the preferred embodiment thereof as shown in the accompanying drawing.

Best Mode for Carrying Out the Invention

Figure 1:
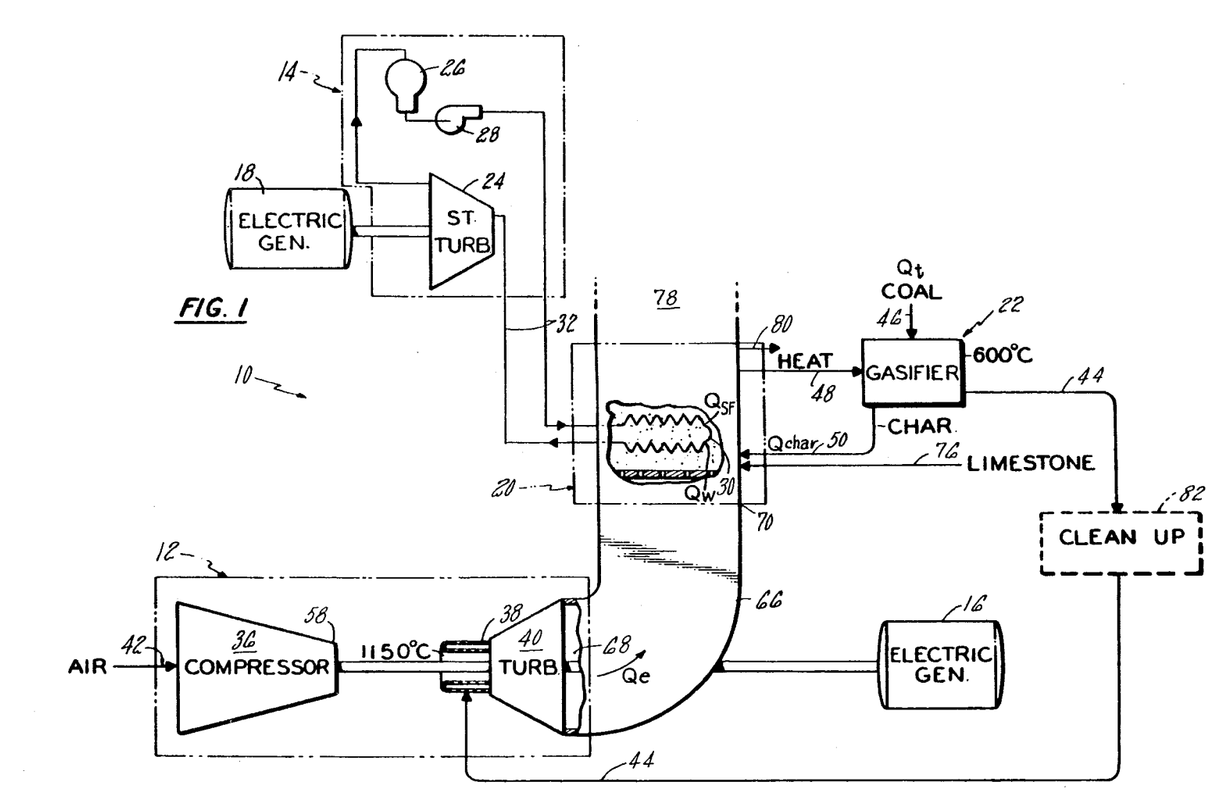
FIG. 1 is a schematic diagram of a coal-fired apparatus employing a gas turbine engine cycle and a steam turbine engine cycle.

FIG. 1 is a schematic diagram of a combined gas turbine and steam turbine engine cycle apparatus 10 employing the combustion of coal in powering the engines. The particular embodiment shown is designed to operate at temperatures which are noted in the schematic although other embodiments of this invention may operate at other temperatures as appropriate. The apparatus includes a gas turbine engine 12 and a steam turbine engine 14. An electrical generator 16 is mechanically coupled to the gas turbine engine. An electrical generator 18 is mechanically coupled to the steam turbine engine. The apparatus further includes an auxiliary combustor such as the fluidized bed combustor 20 and a coal conversion means such as the partial gasifier 22. Each of these devices is well known in the art and each is discussed at length in the publication entitled "Clean Fuels from Coal-Symposium 2", available from the Institute of Gas Technology, Chicago, Ill.

The steam turbine engine 14 includes components such as a steam turbine 24, a condenser 26, a pump 28 and a waste heat boiler 30. A flow path 32 for a working medium fluid extends through these components and is in fluid communication with the components. The boiler is disposed in the auxiliary combustor 20. The boiler is in heat transfer communication with the auxiliary combustor and with gases passing through the auxiliary combustor such as the effluent of the gas turbine engine 12.

The gas turbine engine 12 includes a compressor section 36, a combustion section such as an annular combustion chamber 38 and a turbine section 40. A working medium flow path 42 extends through these sections. A conduit 44 extending into the annular combustion chamber of the gas turbine engine places the working medium flow path of the engine in fluid communication with the partial gasifier 22.

The partial gasifier 22 receives coal from the transfer device 46. The partial gasifier uses heat and partial combustion to extract from the coal combustible fluids for the gas turbine engine 12 and char for the auxiliary combustor 20. A conduit 48 for transferring heat extends from the auxiliary combustor to the partial gasifier. A transfer device 50 for transferring char extends between the partial gasifier and the auxiliary combustor 20. A conduit 66 for gas turbine effluent extends between the outlet 68 of the gas turbine engine and the inlet 70 of the fluidized bed. The conduit places the auxiliary combustor in fluid communication with the exhaust of the gas turbine.

Figure 2:
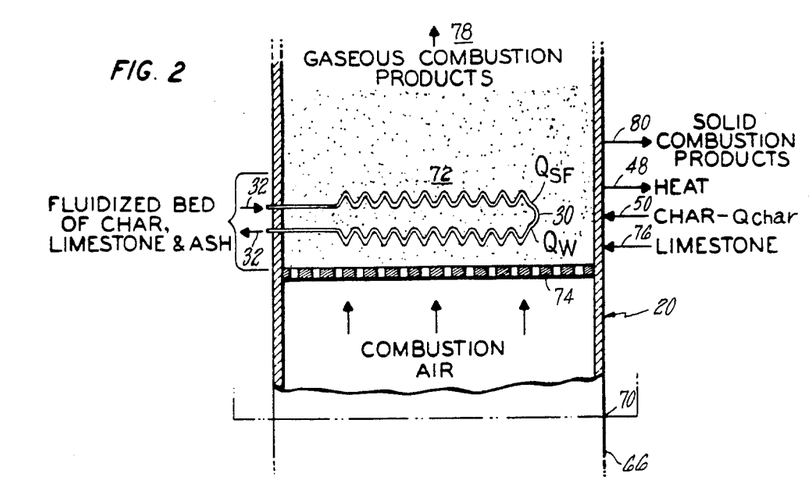
FIG. 2 is a schematic diagram of a fluidized bed combustor shown in FIG. 1.

FIG. 2 is a schematic view of the fluidized bed combustor 70. The bed has a cavity 72. A means for metering flow such as a metering aperture plate 74 is disposed between the inlet 70 and the cavity 72. The cavity receives char from the transfer device 50 and limestone from a transfer device 76. The bed has an outlet 78 for the gaseous products of combustion and a transfer device 80 for removing the non-gaseous products of combustion.

During operation of the coal fired, combined cycle apparatus, coal is fed into the partial gasifier 22. The gasifier is operated at a preselected distillation temperature to produce char and fluids (gas) in the correct proportions. As an example, a distillation temperature of approximately six hundred degrees Centigrade (600° C.) causes the production of a volatile gas having a heating value in excess of five hundred British Thermal Units per standard cubic foot (H.V. > 500 Btu/scf). For a typical low volatile sub-bituminous coal, distillation at six hundred degrees Centigrade (600° C.) yields the following approximate percentages by weight: char, sixty-three percent (63%); water, ten and three tenths percent (10.3%); dry tar, nine and five tenths percent (9.5%); light oil, one and six tenths percent (1.6%); gas, fifteen percent (15%); and hydrogen sulfide, eight tenths of one percent (0.8%).

The char produced during gasification is transferred by the transfer device 50 to the fluidized bed combustor 20 and is burned with oxygen in the exhaust gases from the gas turbine engine 12 to form a high temperature gas. Heat is transferred from the high temperature gas of the fluidized bed via the conduit 48 to the partial gasifier for converting coal into combustible fluids and a combustible char. The combustible fluids in gaseous form include combustibles ($CH_4$, $CO$ and $H_2$), inerts ($N_2$ and $CO_2$) and pollutants ($H_2S$, $NH_3$, H3, tar and dust). These pollutants may be removed from the gas before the gas is flowed to the combustion chamber of the gas turbine engine. For example, a cleanup system 82 such as a Rectisol ® or Purisol ® system using a chemical purification process to remove sulfur compounds and particulates might be employed. Tars and light oil may also be removed from the combustible fluids and stored for later consumption in the gas turbine engine or may be used to promote combustion in the auxiliary combustor by being burned with the combustible char. The combustible fluids (gases) produced are flowed through conduit 44 from the partial gasifier to the gas turbine engine 12 to power the engine.

During operation of the gas turbine engine a working medium gas such as air containing oxygen is introduced into the compressor 36. The working medium gas is compressed by the compressor raising the temperature and the pressure of the working medium gas. The working medium gas is flowed from the compressor and is introduced into the inlet of the combustion chamber 64. Combustible fluids from the partial gasifier 22 are introduced into the combustion chamber via the conduit 44. The combustible fluids are burned with the hot working medium gases to increase the temperature of the working medium gases to above eleven hundred and fifty degrees Centigrade (1150° C.). These hot working medium gases are introduced into the turbine 40. The gases are expanded through the turbine doing work on the turbine. The mechanical couplings between the turbine and the compressor and between the turbine and the electrical generator enable the turbine to drive these devices.

The pressurized effluent or exhaust from the turbine is flowed via the conduit 66 to the inlet of the fluidized bed 70. The effluent is introduced into the cavity 72 of the fluidized bed through the metering plate 74. Because the pressurized effluent passes rapidly through the bed, the effluent fluidizes the bed to promote the combustion reaction. This pressurized effluent contains unconsumed oxygen and provides combustion oxygen to the fluidized bed. The combustion oxygen is consumed with the char and limestone by burning to produce a high temperature gas containing essentially all of the heating value of all of the char formed in the partial gasifier. Products of combustion result from burning this char. The products of combustion include gaseous matter and non-gaseous matter. The non-gaseous matter, such as ash, is recoved by the transfer device 80. The gaseous matter, such as flue gas, is flowed from the fluidized bed through the outlet 78. A portion of the heat in the hi-gh temperature gas formed by burning the char is transferred via the boiler 30 to the working medium fluid of the steam turbine engine to raise steam. The steam is expanded through the steam turbine 24 to power the steam turbine engine. Another portion of the heat in the high temperature gas is transferred via the conduit 48 to the partial gasifier 22.

For each particular coal and for a gas turbine engine operating at a particular combustor exit temperature (turbine inlet temperature), it is desirable to produce combustible fluids and solids in a proportion that optimizes the efficiency of the combined cycle. The efficiency of the combined cycle is a function of the efficiency of the partial gasifier and of the efficiency of the steam turbine engine.

Figure 3:
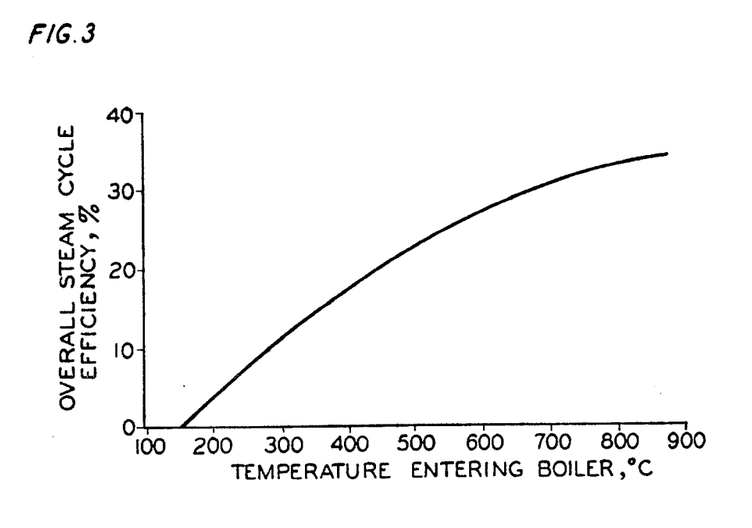
FIG. 3 is a graphical representation of steam cycle efficiency versus the temperature of the working medium fluid entering the boiler of an exemplary steam turbine engine.

The overall efficiency of the steam turbine engine cycle is a function of the temperature of the working medium fluid entering the boiler. A graphical representation of an efficiency curve of an exemplary steam turbine engine cycle is shown in FIG. 3. This particular cycle operates at a condenser pressure of seventy-six and two-tenths millimeters of mercury (76.2 mm. Hg.), ten percent (10%) moisture and a stack temperature of one hundred and fifty degrees Centigrade (150° C.). The overall efficiency of the cycle increases with temperature over the temperature range shown. Burning an additional amount of char in the auxiliary combustor to supplementary fire the boiler raises the cycle temperature and increases the efficiency of the steam cycle.

Figure 4A:
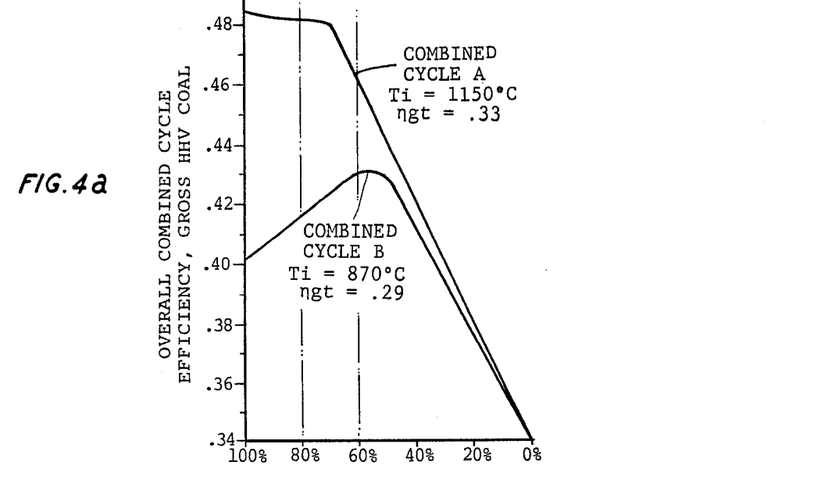
FIG. 4a is a graphical representation of the effect of supplementary firing alone on the efficiency of a combined cycle.

FIG. 4a shows the effect of supplementary firing alone on the efficiency of a combined cycle. The combined cycle employs a steam turbine engine cycle and a gas turbine engine cycle. Two curves are shown in FIG. 4a, each representing a combined cycle employing a particular gas turbine engine cycle in combination with the same steam engine cycle. Conbined cycle A employs a gas turbine engine Agt having a turbine inlet temperature of approximately eleven hundred and fifty degrees Centigrade (1150° C.) and a gas turbine engine efficiency of approximately thirty-three percent ($\eta gt \approx 33\%$). Combined cycle B employs a gas turbine engine Bgt having a turbine inlet temperature of approximately eight hundred and seventy degrees Centigrade (870° C.) and a gas turbine engine efficiency of twenty-nine percent ($\eta gt \approx 29\%$). Because FIG. 4a analytically treats the effect of supplementary firing separately from the effect of partial gasification, the efficiency of each combined cycle is based on the summation of the heating value of the fuel fed into the combustion chamber of the gas turbine engine and the heating value of fuel fed into the boiler of the steam turbine engine. The efficiency of the combined cycles in FIG. 4a is graphically represented versus the amount of heating value of fuel fed into the gas turbine engine as a percent of the total amount of heating value of fuel used in the combined cycle. The amount of heating value of fuel sent to the gas turbine engine for both cycle A and cycle B is enough to maintain the predetermined turbine inlet temperature which are respectively approximately eight hundred and seventy degrees Centigrade (870° C.) and eleven hundred and fifty degrees Centigrade (1150° C.). At every point along the horizontal axis of FIG. 4a, that amount of fuel is constant; but that amount of fuel decreases as a percentage of the total amount of fuel fed into the combined cycle as additional fuel is consumed in the auxiliary combustor to supplementary fire the steam turbine cycle. The highest overall cycle efficiency of cycle B occurs where approximately sixty percent (60%) of the total fuel consumed in the combined cycle is fed into the gas turbine engine. FIG. 4a suggests that supplementary firing alone increases the overall efficiency of cycle B (TL≈870° C.). On the other hand, FIG. 4a suggests that supplementary firing alone does not increase the overall efficiency of cycle A because the maximum efficiency occurs where one hundred percent (100%) of the fuel fed into the combined cycle is fed into the gas turbine engine. However, this does not take into account the efficiency of the partial gasifier.

Gasifiers are highly efficient in deriving gaseous products from the volatile matter in coal, but less efficient in deriving gaseous products from the nonvolatile matter in coal. Losses associated with operating the gasifier in the non-volatile matter range decrease the overall efficiency of the combined cycle and produce a peak in the overall efficiency curve at a point less than one hundred percent (100%) gasification. These losses are generally attributable to pumping and heat losses associated with the volume flow of the fuel gas to the gas turbine engine. The fuel gas volumes required in partial gasification systems, such as gasification in the volatile matter range, are much less than for comparable full gasification systems which suggest that lower losses and higher gasification efficiencies must occur for some operating points as compared to others. One way to quantify the gasifier efficiency is to express as a ratio the quantity of the heating value produced as combustible fluids and combustible char to the quantity of the heating value contained in the coal introduced into the partial gasifier.

Figure 4B:
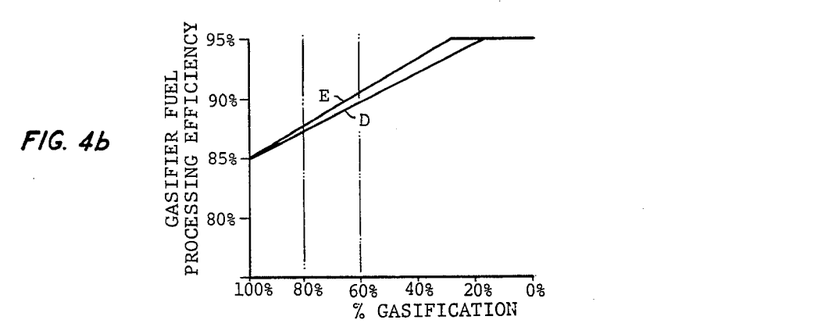
FIG. 4b is a graphical representation of gasifier fuel processing efficiency versus the percentage of coal which is gasified.

FIG. 4b is a good approximation of the efficiencies associated with operating a gasifier at different percentages of gasification. (Because only combustible fluids go to the gas turbine engine and only char goes to the auxiliary combustor during operation of the combined cycle shown in FIG. 1, the percentages of gasification are also equal to the amount of heating value of fuel fed into the gas turbine engine as a percent of the total amount of heating value of fuel used in the combined cycle.) With respect to efficiency, the gasifier efficiency is approximately ninety-five percent (95%) during gasification in the absence of uncombined free oxygen. Combustible fluids and combustible char are produced. Assuming the coal contains twenty percent (20%) volatiles (FIG. 4b, curve D), the efficiency of the gasifier begins to decrease at twenty percent gasification as oxygen is added to obtain gasification of the remaining coal. The additional gasification causes the volume flow of gas to increase, decreasing the formation of char. As more oxygen is added, the volume of the gas flow increases and the efficiency of the gasifier is reduced until the gasifier reaches full gasification operating at eighty-five percent (85%) efficiency. At this point, only fluid (gaseous) combustibles are produced. No char is formed and all the heating value is present in the gaseous combustibles.

Additional inefficiency associated with full gasification results from the required use of a cleanup system 82 to meet air pollution standards as well as to avoid the particulate-caused damage to the gas turbine. The only available cleanup systems are based on chemical processes that work at low temperatures. Cooling the large volume of gases to low temperatures for cleanup may be accomplished by transferring heat into the steam system of a combined cycle. Even then the efficiency of the steam portion of the cycle is less than the combined cycle efficiency causing a decrease in the efficiency of the combined cycle.

The problem is aggravated by using air to supply the oxygen. Dry air by volume percent is approximately seventy-eight percent (78%) nitrogen and only twenty-one percent (21%) oxygen. Accordingly, the volume flows are increased as inert nitrogen is pumped through the system. If pure oxygen is used instead of air, the heat and pumping losses associated with cleaning the combustible fluids in conduit 44 is reduced, but these losses are more than offset by the work required to produce oxygen.

For coal having thirty percent (30%) volatiles, the gasifier efficiency will remain high until those volatiles are driven off (FIG. 4b, curve E). At that point, increased volume flow caused by the presence of inert gas causes the gasifier efficiency to begin to decrease. Again an efficiency of eighty-five percent (85%) represents the efficiency associated with complete fuel gasification. A review of the literature concerning different gasification cycles indicates that the graphical representation of efficiencies shown in FIG. 4b is conservative for pyrolysis, i.e., zero to thirty percent gasification (0-30%) and optimistic for one hundred percent (100%) gasification.

Figure 4C:
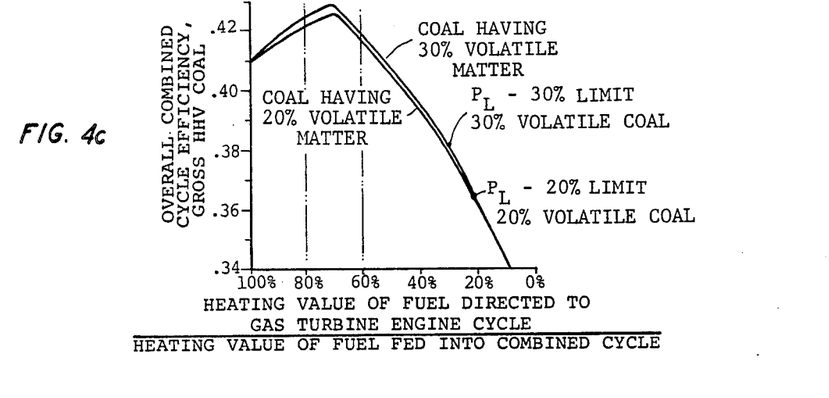
FIG. 4c is a graphical representation of the overall combined cycle efficiency versus the percentage of heating value of fuel fed into the combined cycle which is directed to a turbine engine.

FIG. 4c is a graphical representation of the overall efficiency of combined cycle A and reflects both the effect on efficiency of supplementary firing the boiler and the effect on efficiency of partial gasification of the gasifier. The maximum overall efficiency for the combined cycle occurs where between sixty percent (60%) and eighty percent (80%) of the total amount of heating value of fuel is directed to the gas turbine engine. The amount of fuel directed to the auxiliary combustor for supplementary firing of the steam boiler is in a range between twenty percent (20%) and forty percent (40%) of the total amount of heating value of fuel fed into the combined cycle through the partial gasifier.

In summary, the operation of the combined cycle powerplant shown in FIG. 1 includes the following steps:

(1) feeding coal having a total heating value $Q_t$ into the partial gasifier 22;

(2) converting the coal into combustible fluids and combustible char in the partial gasifier such that the amount of char produced has a heating value $Q_{char}$ which is equal to a percentage of the heating value of the coal fed into the partial gasifier; (the heating value $Q_{char}$ is equal to the amount of heat $Q_{sf}$ transferred of the high temperature gas of the auxiliary combustor to the working medium fluid in the boiler 30 of the steam turbine engine 14 to raise steam).

(3) burning the combustible fluids having a heating value $Q_{gte}$ which is required to establish the turbine inlet temperature of the gas turbine engine with the working medium gas of the gas turbine engine in the combustion chamber 38 of the engine to produce the high temperature working medium gas;

(4) expanding the working medium gas through the turbine of the gas turbine engine to power the output device of the gas turbine engine;

(5) exhausting the working medium gas expanded through the turbine into the auxiliary combustor to provide oxygen and an amount of heat $Q_e$ to the auxiliary combustor;

(6) burning all the char from the partial gasifier in the auxiliary combustor using the oxygen and the heat $Q_e$ from the exhausted working medium gases to produce a high temperature gas in the auxiliary combustor;

(7) transferring an amount of heat $Q_w$ from the high temperature gas of the auxiliary combustor to the working medium fluid in the boiler of the steam turbine engine to raise steam, the amount of heat $Q_w$ being less than the amount of heat $Q_e$ ($Q_w < Q_e$); and (8) transferring the additional amount of heat $Q_{sf}$ from the high temperature gas of the auxiliary combustor to the working medium fluid in the boiler to maximize the efficiency of the combined cycle through supplementary firing.

As shown in FIG. 4b and FIG. 4c, the partial gasifier gasifies all of the volatile matter in the coal and is operated to gasify an additional amount of coal containing non-volatile matter. For example, the point of gasification of all the volatile matter in the twenty percent volatile coal, $P_{L-20\%}$, is reached when the overall efficiency of the cycle is approximately thirty-six percent (36%). The point of complete gasification of all the volatile matter in the thirty percent volatile coal, $P_{L-30\%}$, is reached when the overall efficiency of the combined cycle is thirty-eight percent (38%). The highest efficiency occurs with supplementary firing where as shown in FIG. 4b, the partial gasifier is operating at reduced efficiency. A more detailed embodiment of the FIG. 1 combined cycle operates to enable the partial gasifier to perform at a higher gasification efficiency.

Figure 5:
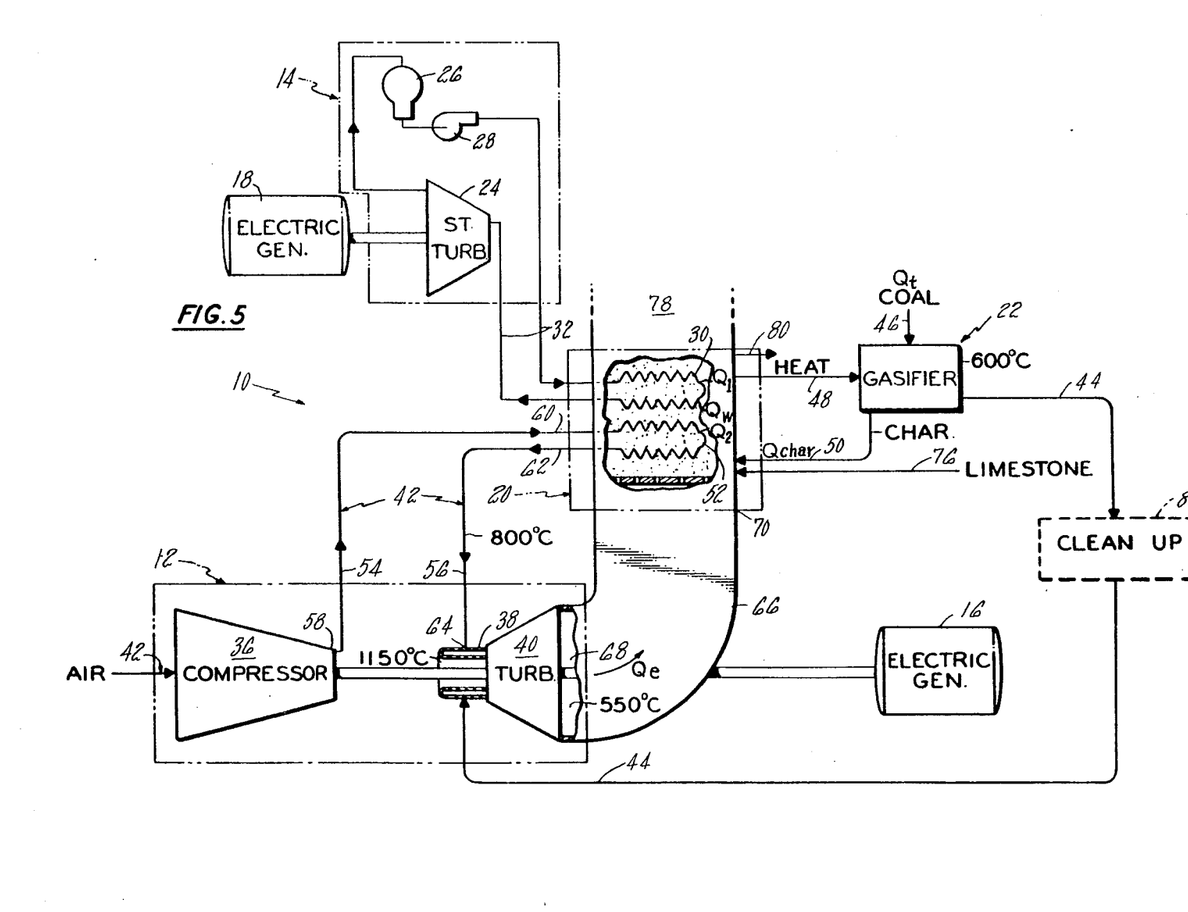
FIG. 5 is a schematic diagram of a more detailed embodiment of the coal-fired apparatus of FIG. 1.

FIG. 5 is a detailed embodiment of the combined cycle illustrated in FIG. 1. As shown in FIG. 5, a heat exchanger 52 is disposed in the auxiliary combustor 20. The heat exchanger is in heat transfer communication with the auxiliary combustor. A portion of the working medium flow path of the gas turbine engine extends through the heat exchanger via conduit 54, and conduit 56. These conduits bound a portion of the working medium flow path 42 of the gas turbine engine. The conduit 54 is in fluid communication with the outlet 58 of the compressor and the inlet 60 of the heat exchanger. The conduit 56 is in fluid communication with the outlet 62 of the heat exchanger and the inlet 64 of the combustion chamber. In other respects the operation of the combined cycle shown in FIG. 5 is identical to the operation of the combined cycle shown in FIG. 1.

Figure 6:
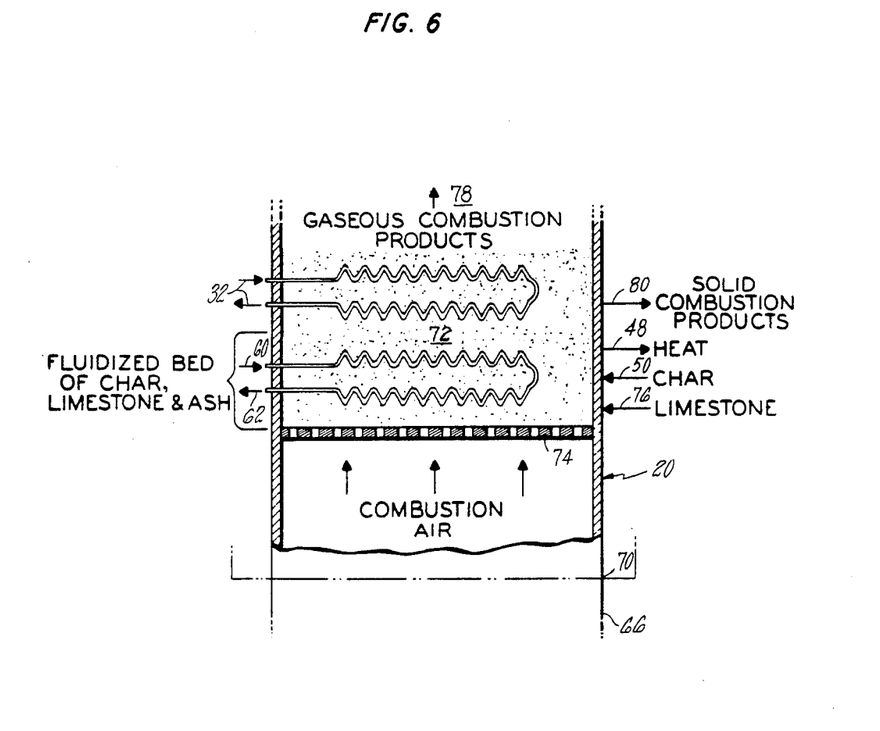
FIG. 6 is a schematic diagram of a fluidized bed combustor contained in the schematic diagram of FIG. 5.

FIG. 6 is a schematic view of the fluidized bed combustor 70. The steam boiler 30 and the heat exchanger 52 of the gas turbine engine are shown.

During operation of the gas turbine engine in the combined cycle illustrated by FIG. 5, the working medium gas is flowed from the compressor outlet 58 through the conduit 54 to the heat exchanger 52. The working medium gas is introduced into the inlet 60 of the heat exchanger 52 which is disposed in the fluidized bed combustor 70. As the working medium gas is flowed through the heat exchanger the gas receives heat from the heat exchanger increasing the temperature of the gas to a value as high as eight hundred degrees Centigrade (800° C.). Although higher temperatures may be desired from a cycle efficiency standpoint depending on the volatility of the coal used, higher gas temperatures would exceed the temperature limitations of the materials from which present-day turbine and heat exchanger components are manufactured. A portion of the heat in the high temperature gas of the auxiliary combustor 20 is transferred via the heat exchanger 52 to the working medium gas of the gas turbine engine to raise the temperature of the working medium gas. The working medium gas is flowed thence from the outlet 62 of the heat exchanger via conduit 56 and enters the combustion chamber 38.

By burning char in the auxiliary combustor and transferring heat to the gas turbine engine via the heat exchanger in the auxiliary combustor, an amount of the non-volatile portion of the coal is burned in the auxiliary combustor decreasing the amount of gasified coal required to be produced in the gasifier for the gas turbine engine in proportion to the increase in the consumption of char.

Figure 7:
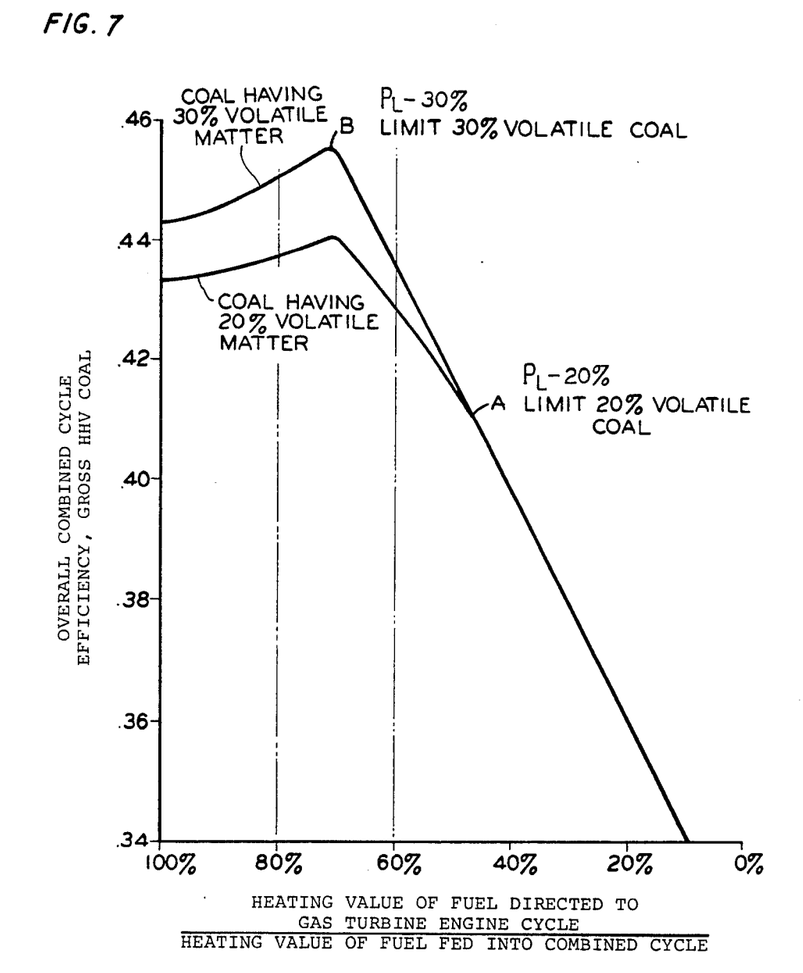
FIG. 7 is a graphical representation of the overall combined cycle efficiency versus the percentage of the heating value of the fuel fed into the combined cycle which is directed to a gas turbine engine operating at a turbine inlet temperature of eleven hundred fifty degrees Centigrade (1150° C.).

As shown in FIG. 7, an increase in the efficiency of the combined cycle A results. FIG. 7 is a graphical representation of the overall efficiency of the combined cycle shown in FIG. 5 based on the gross higher heating value of the coal fed into the partial gasifier versus the amount of heating value of fuel directed to the gas turbine engine as a percentage of the total amount of heating value of fuel used in the combined cycle. The amount of heating value of fuel sent to the gas turbine engine via the gas from the partial gasifier and via the char to the auxiliary combustor is equal to the energy sent to the gas turbine engine shown in FIG. 1 via the gas from the partial gasifier. In both cases the amount of energy is sufficient to maintain a turbine inlet temperature of approximately one thousand one hundred fifty degrees Centigrade (1150° C.). Point $P_{L-20\%}$ marks the operating point where, for coal containing twenty percent volatile matter, all the volatile matter in the coal has been gasified and an additional portion of coal not containing volatile matter must be gasified to provide an amount of gas flowing to the gas turbine engine consistent with the turbine inlet temperature of one thousand one hundred fifty degrees Centigrade (1150° C.) and consistent with the maximum temperature of eight hundred degrees Centigrade (800° C.) in the heat exchanger of the auxiliary combustor. Point $P_{L-30\%}$ on FIG. 7 marks the operating point where, for coal containing thirty percent volatile matter, all of the volatile matter in the coal is gasified. As can be seen, enough heating value of the coal is transferred to the auxiliary combustor to the gas turbine engine so that all the volatile matter in the thirty percent volatile coal is gasified to supply the gas turbine engine with a sufficient heating value to maintain a turbine inlet temperature of eleven hundred fifty degrees Centigrade (1150° C.), and to operate at the point of peak overall efficiency, point B. The difference in efficiency between the twenty percent volatile matter coal and the thirty percent volatile matter coal is a reflection of the increase in the efficiency of the partial gasifier resulting from decreasing the mass flows through the partial gasifier. Nevertheless, whether twenty percent volatile matter coal is used or thirty percent volatile matter coal is used, for a turbine inlet temperature of approximately eleven hundred fifty degrees Centigrade (1150° C.), the overall maximum efficiency of the combined cycle occurs where approximately sixty percent to eighty percent of the total fuel used in the combined cycle is employed in the gas turbine engine.

In summary, the operation of the combined cycle powerplant shown in FIG. 5 includes the following steps:

(1) feeding coal having a total heating value $Q_t$ into the partial gasifier 22;

(2) converting the coal into combustible fluids and combustible char in the partial gasifier such that the amount of char produced has a heating value $Q_{char}$ equal to a percentage of the heating value of the coal fed into the partial gasifier;

(3) burning the combustible fluids with the heating working medium gas of the gas turbine engine 12 in the combustion chamber 38 of the engine to produce a high temperature working medium gas;

(4) expanding the working medium gases through the turbine 40 of the gas turbine engine to power the output device of the gas turbine engine;

(5) exhausting the working medium gases expanded through the turbine into the auxiliary combustor to provide oxygen and an amount of heat $Q_e$ to the auxiliary combustor;

(6) burning all of the char from the partial gasifier in the auxiliary combustor 20 using the oxygen and the heat $Q_e$ from the exhausted working medium gases of the gas turbine engine to produce a high temperature gas;

(7) transferring an amount of heat $Q_w$ from the high temperature gas of the auxiliary combustor to the working medium fluid in the boiler 30 of the steam engine 14 to raise steam, the amount of heat $Q_w$ being less than the amount of heat $Q_e$ ($Q_w < Q_e$);

(8) transferring an additional amount of heat $Q_f$ from the high temperature gas of the auxiliary combustor to the working medium fluid in the boiler to maximize the efficiency of the combined cycle through supplementary firing;

(9) transferring an amount of heat $Q_2$ from the high temperature gas of the auxiliary combustor 20 to the working medium gas of the gas turbine engine to raise the temperature of the working medium gas after the working medium gas passes through the compressor 36, the amount of heat $Q_2$ being less than or equal to the quantity $Q_c$ ($Q_2 < Q_c$), the quantity $Q_c$ being equal to the heating value $Q_t$ contained in the coal minus the heating value contained in the volatiles $Q_v$ of the coal and minus the amount of heat $Q_1$ transferred from the auxiliary combustor to the steam boiler for supplemental firing ($Q_c = Q_t - Q_v - Q_1$);

(10) expanding the working medium fluid through the turbine of the steam engine to power the output device of the steam turbine engine;

wherein the amount of char produced has a heating value $Q_{char}$ equal to the sum of the amount of heat $Q_1$ transferred from the high temperature gas of the auxiliary combustor to the working medium fluid in the boiler of the steam turbine engine and the amount of heat $Q_2$ transferred from the high temperature gas of the auxiliary combustor to the working medium gas to the gas turbine engine ($Q_{char} = Q_1 + Q_2$).

As shown in FIG. 5, an amount of heat $Q_g$ may be transferred from the high temperature gas of the auxiliary combustor 20 to the partial gasifier 22 for converting coal into combustible char and combustible fluids. The sum of the amount of heat $Q_w$ and the amount of heat $Q_g$ is less than the amount of heat $Q_e$ ($Q_w + Q_g < Q_e$).

The consumption of the char in the auxiliary combustor enables the utilization of a portion of the heating value of the char in the gas turbine engine without exposing components of the gas turbine engine to harmful particulates associated with burning coal. In addition, the consumption of char in the auxiliary combustor enables burning the non-volatile matter of coal within the auxiliary combustor to transfer heat from the non-volatile matter to the gas turbine engine, to increase the efficiency of the steam turbine engine cycle and, concomittantly, to increase the efficiency of the partial gasifier.

Although the invention has been shown and described with respect to preferred embodiments thereof, it should be understood by those skilled in the art that various changes and omissions in the form and detail thereof can be made therein without departing from the spirit and the scope of the invention.

I claim:

1. A method for producing power from coal in a combined cycle powerplant using a gas turbine engine formed of a compressor, a combustion chamber, and a turbine connected to a power output device, using a steam turbine engine including a boiler and a steam turbine connected to a power output device and using an auxiliary combustor, comprising the steps of:

feeding coal having a total heating value $Q_t$ into a partial gasifier;

converting the coal into combustible fluids and combustible char in the partial gasifier such that the amount of combustible fluids produced has a heating value which lies in a range of sixty to eighty percent (60-80%) of the total heating value $Q_t$ and the amount of char produced has a heating value $Q_{char}$ equal to a percentage of the heating value of the coal fed into the partial gasifier;

burning the combustile fluids with the oxygen containing working medium gas of the gas turbine engine in the combustion chamber of the engine to produce a high temperature working medium gas;

expanding the working medium gases through the turbine of the gas turbine engine to power the output device of the gas turbine engine;

exhausting the working medium gas expanded through the turbine into the auxiliary combustor to provide oxygen and an amount of heat $Q_e$ to the auxiliary combustor;

burning all of the char from the partial gasifier in an auxiliary combustor using the oxygen and the heat $Q_e$ from the exhausted working medium gases to produce a high temperature gas;

transferring an amount of heat from the high temperature gas of the auxiliary combustor to the working medium fluid in the boiler of the steam turbine engine to raise steam, the amount of heat being equal to the summation of a first amount of heat $Q_w$ which is less than $Q_e$, ($Q_w < Q_e$) and a second amount of heat $Q_{sf}$ such that the amount of heat ($Q_{sf} + Q_w$) transferred to the working medium fluid in the boiler maximizes the efficiency of the combined cycle through supplementary firing;

expanding the working medium fluid through the turbine of the steam engine to power the output device of the steam turbine engine;

wherein the amount of char produced has a heating value $Q_{char}$ equal to the amount of heat $Q_{sf}$ transferred from the high temperature gas of the auxiliary combustor to the working medium fluid in the boiler of the steam turbine engine to raise steam ($Q_{char} = Q_{sf}$); wnerein the coal is consumed to produce energy and the turbine is isolated by the auxiliary combustor from harmful particulates produced by burning the char.

2. A method for producing power from coal in a combined cycle powerplant using a gas turbine engine formed of a compressor, a combustion chamber, and a turbine connected to a power output device, using a steam turbine engine including a boiler and a steam turbine connected to a power output device and using an auxiliary combustor comprising the steps of:

feeding coal having a total heating value $Q_t$ into a partial gasifier;

converting the coal into combustilble fluids and combustible char in the partial gasifier such that the amount of combustible fluids produced has a heating value and the amount of char produced has a heating value $Q_{char}$ equal to a percentage of the heating value of the coal fed into the partial gasifier;

burning the combustible fluids with the heated working medium gas of the gas turbine engine in the combustion chamber of the engine to produce a high temperature working medium gas;

expanding the working medium gases through the turbine of the gas turbine engine to power the output device of the gas turbine engine;

exhausting the working medium gases expanded through the turbine into the auxiliary combustor to provide oxygen and an amount of heat $Q_e$ to the auxiliary combustor;

burning all of the char from the partial gasifier in an auxiliary combustor using the oxygen and the heat $Q_e$ from the exhausted working medium gases to produce a high temperature gas;

transferring an amount of heat from the high temperature gas of the auxiliary combustor to the working medium fluid in the boiler of the steam turbine engine to raise steam, the amount of heat being equal to the summation of a first amount of heat $Q_w$ which is less than the amount of heat $Q_e$, i.e. ($Q_w < Q_e$) and a second amount of heat $Q_1$ such that the amount of heat ($Q_1 + Q_w$) transferred to the working medium fluid in the boiler maximizes the efficiency of the combined cycle through supplementary firing;

transferring an amount of heat $Q_2$ from the high temperature gas of the auxiliary combustor to the working medium gas of the gas turbine engine to raise the temperature of the working medium gas after the working medium gas passes through the compressor;

expanding the working medium fluid through the turbine of the steam engine to power the output device of the steam turbine engine;

wherein the amount of char produced has a heating value $Q_{char}$, the sum of the heating value of the char $Q_{char}$ and the amount of heat $Q_e$ being greater than the sum of the amount of heat ($Q_1 + Q_w$) transferred from the high temperature gas of the auxiliary combustor to the working medium fluid in the boiler of the steam turbine engine to raise steam and the amount of heat $Q_2$ transferred from the high temperature gas of the auxiliary combustor to the working medium gas of the gas turbine engine $Q_{char}+Q_e>Q_1+Q_w+Q_2$); wherein the heating value of the combustible fluids produced and the amount of heat $Q_2$ transferred from the high temperature gas of the auxiliary combustor to the working medium gas of the gas turbine engine lies in the range of sixty to eighty percent (60-80%) of the total heating value $Q_t$; and wherein the coal is consumed to produce energy and the turbine is isolated by the auxiliary combustor from harmful particulates produced by burning the char.

3. The method for producing power from coal in a combined cycle of claim 1 further including the step of transferring an amount of heat $Q_g$ from the high temperature gas of the auxiliary combustor to the partial gasifier for converting the coal into combustible char and combustible fluids, the amount of heat $Q_g$ being less than the amount of heat $Q_e$ ($Q_g<Q_e$).

* * * * *